Dec. 10, 1957  L. J. MOWRY  2,816,210
WELDING TOOL
Filed Nov. 21, 1955

INVENTOR.
BY Lorenz John Mowry
Clyde H. Haynes
his atty.

United States Patent Office 2,816,210
Patented Dec. 10, 1957

2,816,210

WELDING TOOL

John Lorenz Mowry, Elyria, Ohio, assignor to Gregory Industries, Inc., Detroit, Mich., a corporation of Michigan Application November 21, 1955, Serial No. 548,000

11 Claims. (Cl. 219—98)

This invention relates to improvements in stud welding guns, and in particular to a stud welding gun which is considerably shorter than the standard gun in present commercial use. The invention also relates to a stud welding gun in which the studs to be welded may be fed through the gun into welding position.

In other stud welding guns, the stud is lifted from the plate by a solenoid to create an arc between the stud and plate and is then plunged into the plate after a predetermined time by a plunger spring. In these guns, the plunger spring, solenoid and the other operating mechanisms are positioned in an end to end relationship in the gun body. Also, the movable and stationary cores for the solenoid are solid rods to provide sufficient magnetic attraction between the stationary and movable cores in the solenoid coil so that the solenoid can lift the stud to be welded from the plate. This makes it impossible to feed the studs to be welded through the cores and into welding position in the stud carrier part of the gun. Attempts to use hollow cores and feed the studs through these hollow cores in these other guns was found impractical, since the studs are sometimes of non-magnetic material or are loose in the cores. This materially alters the magnetic attraction between the movable and stationary core of the solenoid so that consistent operation of the gun is not obtained.

Many of these difficulties have been overcome by the present invention; thus, one of the objects of the present invention is to provide a stud welding gun in which the studs to be welded can be fed through the stud carrier and the center of the gun into welding position in the carrier.

Another object of the invention is to provide a stud welding tool in which the stud carrier is mounted in bearings which are spaced apart and a hollow armature encircling the carrier and operatively connected thereto for moving the carrier, along with its associated solenoid coil, is located between the bearings.

A further object of the invention is to provide a stud welding gun in which the stud carrier is encircled by a solenoid and is shielded from magnetic flux produced by the solenoid by a shield movable relative to the solenoid and operatively attached to the stud carrier.

Other objects and a fuller understanding of the invention will become apparent from the description and claims and the drawings in which:

Figure 1:
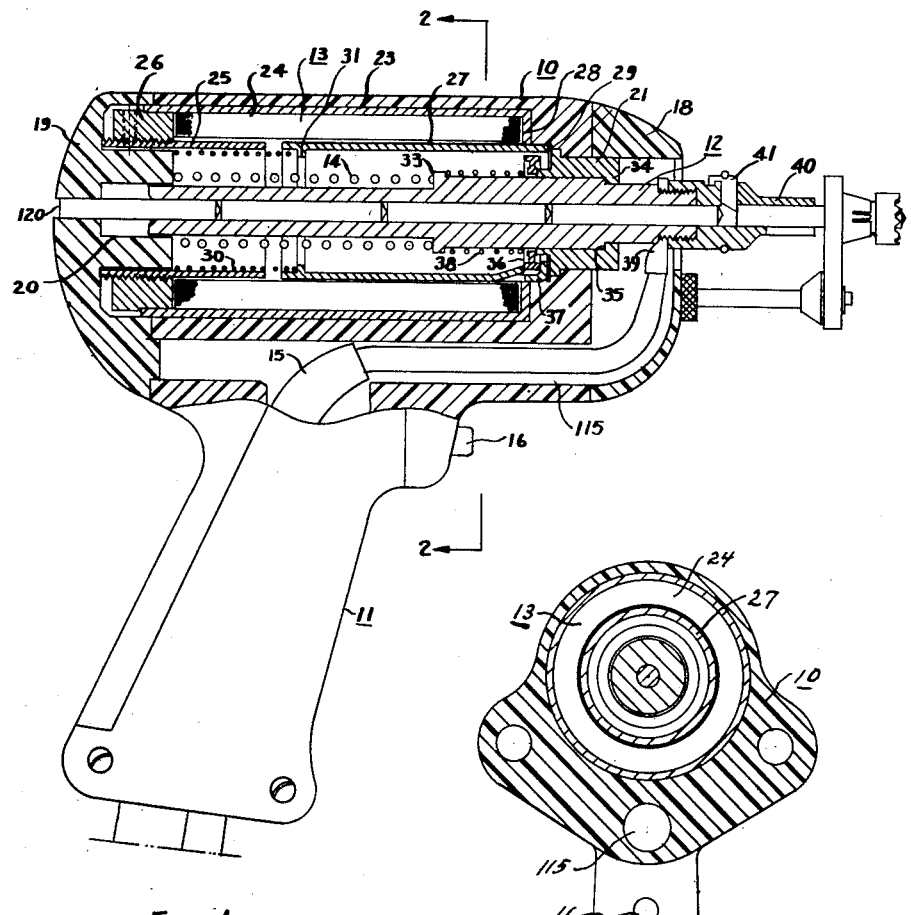
Figure 1 is a sectional view of the stud welding tool.
Figure 2:
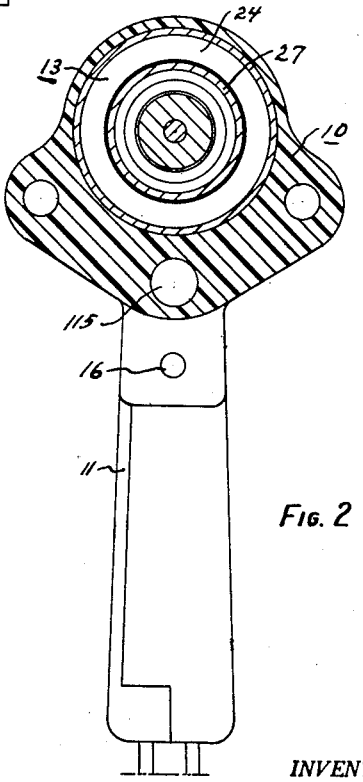
Figure 2 is a sectional view taken along the lines 2—2 of Figure 1.

The stud welding gun illustrated in Figure 1 is constructed from a plastic or other electrically non-conducting body 10 having a handle 11 on the side thereof. Mounted in the body 10 is a stud carrier 12 and a solenoid 13 which moves the stud carrier 12 in one direction relative to the body 10. Also located within the body 10 is a plunger spring 14, which moves the stud carrier in the opposite direction, when the solenoid 13 is not energized.

The stud carrier 12 may be connected to welding power source by a welding cable 15 which passes through a conduit 115 in the gun body and handle. The solenoid 13 may also be energized from the welding power source by suitable wires (not shown) extending through the gun body and handle and controlled by a finger switch 16 in the handle. The details of the electrical connections and the solenoid wiring and the switch are not described herein since they operate the same as those in stud welding guns now on the market as described in co-pending patent applications Serial No. 421,780 or Serial No. 468,376.

The ends of the body 10 are closed by a front cap 18 and a rear cap 19 with the stud carrier 12 extending outwardly through an opening in the front cap 18. The stud carrier 12 is bearinged in rear cap portion 20 of the rear cap 19 and front bearing 21 supported by the gun body 10.

As is illustrated in the drawing, solenoid 13 is mounted between the bearings 20 and 21 and encircling the stud carrier 12. Solenoid 13 has a magnetic flux path tube 23 encircling and supporting solenoid coils 24. The outer magnetic flux path tube 23 also supports a tubular stationary core or magnetic flux conductor 25 which extends on the inside of the solenoid coil 24 from the end next adjacent the rear cap 19 towards the front cap 18. The stationary magnetic flux conductor 25 is non-movably held on the outer flux path tube 23 by a threaded bushing 26.

The solenoid 13 also includes a somewhat tubular armature of movable magnetic flux conductor 27, which is coaxially aligned with the solenoid coil 24 and the stationary magnetic flux conductor 25 for coaxially aligned movement in end to end relation with the stationary flux conductor 25. The outer magnetic flux path tube 23 has an inwardly extending flange 28 in sliding engagement with movable flux conductor 27 and cooperative therewith to form a closed magnetic circuit around the coil 24. The closed magnetic circuit includes the outer flux path tube 23, the flange 28, the movable flux conductor 27, the stationary flux conductor 25 and the threaded bushing 26.

Generally, these flux path parts are constructed from iron or other similar material which will readily conduct magnetic flux so that the stationary magnetic flux path conductor 25 and the movable conductor 27 cooperate to shield the stud carrier 12 from any magnetic field established by the solenoid coil 24 when it is energized. Movable flux conductor 27 is normally held away from the stationary magnetic flux conductor 25 and against a shoulder 29 on the gun body by a coil spring 30 compressed between the rear cap 19 and an internal flange 31 on the inside of the movable flux conductor 27.

The stud carrier 12, as illustrated in Figure 1, may be constructed from a tubular piece of material or it may be constructed from a solid piece of material. Carrier 12 is provided between the ends thereof with an external flange 33 located between the front and rear bearings 20 and 21. The plunger spring 14 previously referred to is maintained in compression between this external flange 33 and the rear bearing portion 20 of the rear cap 19. As is illustrated, the front bearing 21 may be provided with a stop 34 engageable by an external shoulder 35 on the stud carrier 12 to prevent the plunger spring 14 urging the stud carrier 12 completely through the front cap and out of the gun body.

A one way clutch is inserted between the movable flux conductor 27 and the stud carrier 12 to move the stud carrier against the urging of the plunger spring 14 when the solenoid coil is energized. This one way clutch comprises a ring 36 located entirely within the movable flux conductor and encircling the stud carrier 12 at a position between the flange 33 and the front bearing 21. Ring 36 is moved by a hook 37 formed near or at the end of the movable flux conductor 27. In its normal position the ring 36 is maintained at right angles to the axis of the stud carrier 12 and against the front bearing 21 by a clutch spring 38 maintained in compression between the ring 36 and the external flange 33 on the stud carrier 12. When the solenoid coil is energized, movable flux conductor 27 moves ring 36 and the stud carrier 12 to the left in Fig. 1 and against the action of plunger spring 14 until movable flux conductor 27 seats against stationary flux conductor 25.

Electric welding cable 15 is connected to the front end of the stud carrier 12 by providing it with a terminal 39 held on the carrier 12 by a hollow stud receiving chuck 40 which is screwed on the front end of the stud carrier 12.

In Figure 1, the hollow stud carrier 12 has been illustrated and the rear cap 19 has a stud receiving hole 120 therethrough in alignment with stud carrier 12. The carrier chuck 40 is provided with a dog 41 which is engaged by the studs as they are fed endwise through the rear cap 19 and the stud carrier 12. For example, in the illustration, studs to be welded are fed into the stud carrier 12 through the rear cap 19 and past the dog 41. After the stud passes the dog 41, the dog snaps inwardly to form a backup for the stud and to prevent the stud being pushed backwards towards the rear cap 19 when the gun is placed against the work for the welding operation. After one stud is welded and the gun is removed from that welded stud, another stud may be fed forward through the carrier 12 and into the chuck 40 for welding. It has been found that the studs may be fed through the hollow stud carrier inside of the solenoid coil, since the stud carrier is entirely shielded from the magnetic field established by the solenoid coil. This shielding by the stationary and movable flux conductors prevents a stud being fed through the gun from continually changing the effectiveness of the solenoid coil and also prevents the solenoid coil from effecting proper movement of the studs through the hollow carrier.

In the present design, the stud carrier is supported in front and rear bearings in the gun body. The plunger spring for moving the stud carrier in one direction and the solenoid along with the one way clutch for moving the stud carrier in the opposite direction are located in the gun body and between these end bearings. The stud carrier 12 is completely shielded from magnetic flux paths which may be established by the solenoid. The plunger spring, solenoid and the parts of the solenoid all encircle the stud carrier, and are preferably arranged concentric therewith for easy manufacturing.

Although this invention has been described in its preferred form with a certain degree of particularity enabling others to reproduce the invention, it is understood that the present disclosure has been made by way of example and that numerous modifications and changes in the details may be resorted to without departing from the spirit and scope of the invention as defined in the claims which are made a part hereof.

The embodiments of the invention in which an exclusive property or privilege is claimed are defined as follows:

1. A stud welding tool for welding a stud to a plate by moving the stud in a first direction away from the plate and then in a second direction towards the plate, said tool comprising, first and second bearings spaced apart, a stud carrier mounted in said bearings for endwise movement in said first and second directions, means positioned between said bearings and urging said carrier in one of said directions, a hollow armature encircling said carrier and operatively connected thereto to move the carrier in the other of said directions, and a solenoid coil supported between the bearings and around the armature to overcome said means and cause said armature to move said carrier when the solenoid coil is energized.

2. A stud welding tool for welding a stud to a plate by moving the stud in a first direction away from the plate and then in a second direction towards the plate, said tool comprising, first and second bearings spaced apart, a stud carrier mounted in said bearings for endwise movement in said first and second directions, means positioned between said bearings and urging said carrier in one of said directions, a hollow armature encircling said carrier and operatively connected thereto to move the carrier in the other of said directions, and a solenoid coil supported between the bearings and around the armature to overcome said means and cause said armature to move said carrier when the solenoid coil is energized, one of said bearings having means cooperating with said armature and carrier to concentrate magnetic flux established by said coil into a flux path on the outside of the said carrier.

3. A stud welding tool for welding a stud to a plate by moving the stud in a first direction away from the plate and then in a second direction towards the plate, said tool comprising, first and second bearings spaced apart, a stud carrier mounted in said bearings for endwise movement in said first and second directions, said stud carrier being of tubular shape and having means engageable with studs carried thereby to permit movement of the stud in said second direction relative to the carrier and to prevent movement of the stud in said first direction relative to the tube, means positioned between said bearings and urging said carrier in one of said directions, a hollow armature encircling said carrier and operatively connected thereto to move the carrier in the other of said directions, and a solenoid coil supported between the bearings and around the armature to overcome said means, and cause said armature to move said carrier when the solenoid coil is energized.

4. A stud welding tool for welding a stud to a plate by moving the stud in a first direction away from the plate and then in a second direction towards the plate, said tool comprising, first and second bearings spaced apart, a stud carrier mounted in said bearings for endwise movement in said first and second directions, resilient means positioned between one of said bearings and said carrier normally urging said carrier in one of said directions, a hollow armature encircling said carrier and operatively connected thereto to move the carrier in the other of said directions and against the urging of said resilient means, and a solenoid coil supported between the bearings and encircling the armature to overcome said resilient means and cause said armature to move said carrier when the solenoid is energized.

5. A stud welding tool for welding a stud to a plate by moving the stud in a first direction away from the plate and then in a second direction towards the plate, said tool comprising, first and second bearings spaced apart, a stud carrier mounted in said bearings for endwise movement in said first and second directions, said stud carrier being of tubular shape and having means engageable with studs carried thereby to permit movement of the stud in said second direction relative to the carrier and to prevent movement of the stud in said first direction relative to the tube, resilient means positioned beween one of said bearings and said carrier normally urging said carrier in one of said directions, a hollow armature encircling said carrier and operatively connected thereto to move the carrier in the other of said directions and against the urging of said resilient means and a solenoid coil supported between the bearings and encircling the armature to overcome said resilient means and cause said armature to move said carrier when the solenoid coil energized, one of said bearings having means cooperating with said armature and carrier to concentrate magnetic flux established by said coil into a flux path on the outside of the said carrier.

6. In a stud welding device, a stud carrier adapted to support a stud for welding and connectable to a source of welding current, a solenoid coil encircling said stud carrier to establish magnetic flux in a flux path extending longitudinally of and encircling the stud carrier, and a flux conductor between said solenoid coil and said stud carrier to concentrate magnetic flux established by the solenoid coil into a flux path positioned on the outside of the stud carrier, and support means supporting at least a part of the conductor and the stud carrier for movement relative to the solenoid coil, said conductor and said stud carrier having cooperating means causing movement of the stud carrier upon movement of at least a part of the flux conductor when the solenoid coil is energized.

7. In a stud welding device, a stud carrier adapted to support a stud for welding and connectable to a source of welding current, a solenoid coil encircling said stud carrier to establish magnetic flux in a flux path extending longitudinally of and encircling the stud carrier, and a flux conductor between said solenoid coil and said stud carrier to concentrate magnetic flux established by the solenoid coil into a flux path positioned on the outside of the stud carrier, and support means supporting at least a part of the conductor and the stud carrier for movement relative to the solenoid coil when the solenoid coil is energized.

8. A stud welding gun comprising, a somewhat tubular shaped electrically nonconductive body having front and back ends, a stud carrier bearinged in said ends and extending outwardly from the front end to support a stud for welding, said carrier having a flange positioned between the ends of said housing, a plunger spring encircling said carrier between the flange and the back end and urging the carrier outwardly from the front end, a solenoid coil in said housing and encircling said carrier, a stationary magnetic flux conductor in said coil at the end nearest the back end of the body, a tubular shaped movable magnetic flux conductor movable in said coil in coaxial end to end relation with said stationary flux conductor, said movable flux conductor having an internal flange, a coil spring between said conductor flange and said back end of said housing and urging said movable flux conductor away from said stationary flux conductor, a clutch ring within said movable flux conductor and in encircling engagement with said carrier at a position between said carrier flange and said front end, a clutch spring between said carrier flange and said clutch ring and urging the ring towards said front end, said movable conductor having an internal hook extending radially inwardly between the ring and the front end of the housing, and means for electrically energizing said solenoid coil thereby overcoming said coil spring and moving said movable conductor towards said stationary conductor whereby said internal hook causes said ring to move said carrier axially against said plunger spring and inwardly of the front end of the body.

9. A stud welding gun comprising, a hollow electrically non-conductive body, a handle integrally joined on said body, a solenoid coil in said body, a hollow stationary core and a hollow movable armature in said coil in coaxial alignment, bearing means at each end of said coil and carried by said housing in coaxial alignment with said coil and armature, a stud carrier bearinged in said bearing means for sliding movement axially of the body and coil, a first spring between one of said bearing means and said carrier and having physical properties urging said carrier longitudinally away from said one of said bearing means, a second spring between said one of said bearing means and said movable armature and having physical properties urging said movable armature away from said stationary core, and one way clutch means interconnecting said movable armature and said stud carrier, said springs and said clutch means being positioned entirely within said hollow armature and hollow core, said handle and said body having conduit means for supporting a welding cable which may be connected to said carrier.

10. A stud welding tool for welding a stud to a plate by moving the stud in a first direction away from the plate and then in a second direction towards the plate, said tool comprising, first and second bearings spaced apart, a stud carrier mounted in said bearings for endwise movement in said first and second directions, means urging said carrier in one of said directions, a hollow armature encircling said carrier and operatively connected thereto to move the carrier in the other of said directions, and a solenoid coil supported between the bearings and around the armature to overcome said means and cause said armature to move said carrier when the solenoid coil is energized.

11. The structure as defined in the claim 10 including one of said bearings having means cooperating with said armature and carrier to concentrate magnetic flux established by said coil into a flux path on the outside of the said carrier.

References Cited in the file of this patent

UNITED STATES PATENTS

| | | |
|---|---|---|
| 2,191,494 | Nelson | Feb. 27, 1940 |
| 2,413,189 | Nelson | Dec. 24, 1946 |
| 2,640,133 | Ainsworth et al. | May 26, 1953 |